United States Patent [19]

Muramoto

[11] Patent Number: 4,723,704
[45] Date of Patent: Feb. 9, 1988

[54] BIMETAL STEAM TRAP

[75] Inventor: Mutsushi Muramoto, Suita, Japan

[73] Assignee: Miyawaki Steam Trap Mfg. Co., Ltd., Osaka, Japan

[21] Appl. No.: 748,636

[22] Filed: Jun. 25, 1985

[30] Foreign Application Priority Data

Jun. 26, 1984 [JP] Japan .................. 59-132270

[51] Int. Cl.⁴ .................................... F16T 1/08
[52] U.S. Cl. ........................ 236/59; 251/337
[58] Field of Search .............. 236/59, 93 R, 101 B; 251/77, 337

[56] References Cited

U.S. PATENT DOCUMENTS

| | | | |
|---|---|---|---|
| 958,716 | 5/1910 | Bard | 251/77 X |
| 2,142,224 | 1/1939 | Turlay | 251/337 X |
| 3,169,704 | 2/1965 | Domm et al. | 236/59 |
| 3,362,636 | 1/1968 | Miyawaki | 236/59 |
| 3,404,666 | 10/1968 | Thuesen | 251/77 X |
| 3,501,126 | 3/1970 | Williams et al. | 251/77 |

FOREIGN PATENT DOCUMENTS

| | | | |
|---|---|---|---|
| 1414389 | 11/1964 | France | 236/59 |
| 912572 | 12/1962 | United Kingdom | 236/59 |

Primary Examiner—William E. Tapolcai
Attorney, Agent, or Firm—Sughrue, Mion, Zinn, Macpeak & Seas

[57] ABSTRACT

A bimetal steam trap is disclosed, which includes a temperature-responsive valve arrangement and a bimetallic column formed of a plurality of pairs of bimetallic discs which are superposed with each other. The valve arrangement has a valve element normally biased by a spring toward its open position, which biasing force is overcome by the thermal expansion axial thrust generated by the bimetallic column when condensation temperature within the steam trap is above a predetermined level. To permit an axial displacement of the valve element in precise alignment with associated valve opening, an elongate valve member is provided at one end with the valve element, and serves to support the bimetallic column as an integrated sub-assembly.

8 Claims, 2 Drawing Figures

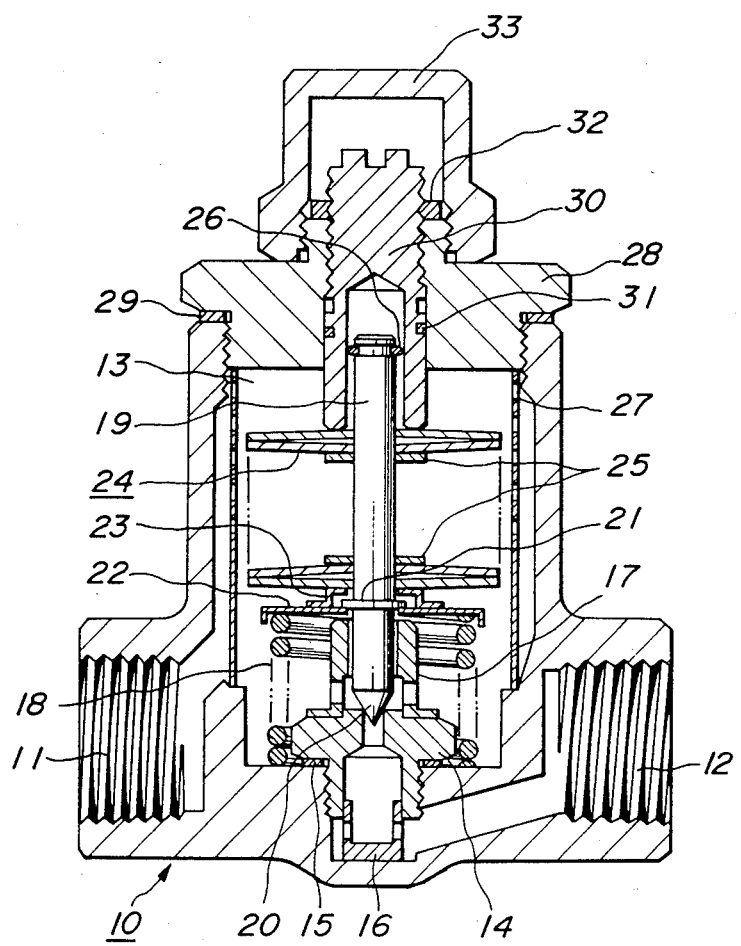
FIG_1

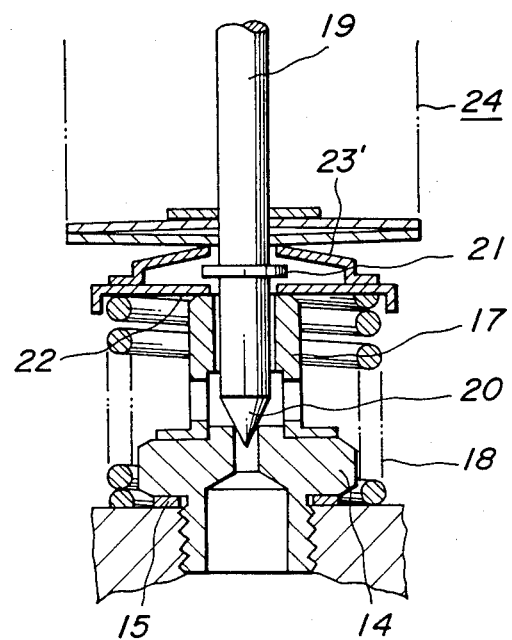
FIG_2

4,723,704

BIMETAL STEAM TRAP

BACKGROUND OF THE INVENTION

1. Field of the Invention

The present invention relates to a bimetal steam trap used to discharge low temperature condensation from a steam system in response to the temperature of condensation.

2. Description of the Prior Art

Conventionally, a bimetal steam trap includes a temperature-responsive valve arrangement with a valve element which assumes an open position when the temperature of condensation is below a predetermined level. As described, e.g., in U.S. Pat. No. 3,362,636, the valve element is normally biased toward its open position by means of a spring, and can be brought into its closed position by the pressure of condensation within the steam trap when the valve element is released from the biasing force of the spring. Because the valve element is to be actuated in response to the temperature of condensation, the steam trap has incorporated therein a bimetallic column including a plurality of pairs of bimetallic discs loosely mounted on a supporting rod and superposed with the other. The bimetallic column is arranged such that when the temperature of condensation within the steam trap is above a predetermined level, the column is subjected to an axial thermal expansion generating an axial thrust which overcomes the biasing force of the spring. With the conventional arrangement, however, because the valve element is axially connected with the rod supporting the bimetallic column by means of a connecting ring, not only the assembly of these components is troublesome and cannot be effected with a high productivity, but also it becomes very difficult to displace the valve element in precise alignment with the valve opening, under the presence of unavoidable manufacturing tolerance, so that an intended accurate operation of the steam trap can hardly be achieved.

SUMMARY OF THE INVENTION

Therefore, it is an object of the present invention to provide an improved bimetal steam trap which can be manufactured with a high productivity, and whose valve element can be displaced in precise alignment with the valve opening, in response to the temperature of condensation, permitting a functionally satisfactory operation of the steam trap.

According to the present invention, there is provided a bimetal steam trap, comprising: a casing with inlet and outlet ports and defining therein a chamber which is in communication with the inlet port; a valve seat member secured to one wall of the chamber and formed with a valve opening which is adapted to bring the chamber into communication with the outlet port; a vertically displaceable valve member having one end formed as a valve element which is engageable with the valve seat surface surrounding the valve opening; means for supporting and guiding the vertical displacement of the valve member in alignment with said valve opening, including a first guide member secured to the valve seat member, and a second guide member secured to the wall of the chamber opposing to said one wall; axial force transmitting means mounted on the valve member so as to be axially movable together with the valve member with a predetermined amount of axial play therebetween; resilient means having one end supported by said one wall of the chamber, and the other end in engagement with one side of said axial force transmitting means so as to axially urge the valve member in a direction in which said valve element is moved away from said valve seat surface; and a bimetallic column including a plurality of pairs of bimetallic discs which are superposed with each other and loosely supported by said valve member, said bimetallic column having one end in engagement with that end portion of the second guide member which opposes to the first guide member, with the other end of the bimetallic column being in engagement with the other side of said axial force transmitting means such that when the bimetallic column is heated by high temperature condensation supplied to the chamber from the inlet port, the bimetallic column generates an axial thermal expansion thrust which is applied to said axial force transmitting means and overcomes the resilient force of said resilient means, thereby permitting the valve member to axially displace in a direction in which said valve element is urged against said valve seat surface under the pressure of the condensation within the chamber.

BRIEF DESCRIPTION OF THE DRAWING

FIG. 1 is a longitudinal sectional view illustrating a bimetal steam trap according to one embodiment of the present invention; and FIG. 2 is a fragmentary sectional view illustrating a modification of the steam trap shown in FIG. 1.

DESCRIPTION OF THE PREFERRED EMBODIMENTS

Referring now to FIG. 1, there is shown a bimetal steam trap according to one embodiment of the present invention, which comprises a casing 10 with an inlet port 11 and an outlet port 12, defining therein a drain chamber 13. A temperature-responsive valve is disposed on the upstream side of the outlet port 12, and includes mechanical elements to be fully described hereinafter, most of which are accommodated within the drain chamber 13. To this end, the drain chamber 13 has a bottom wall, a substantially cylindrical side wall and a top opening.

The temperature-responsive valve has a valve seat member 14 with a lower portion threaded into the bottom wall of the drain chamber 13, and an upper portion in abutting engagement with the upper surface of the bottom wall with a gasket ring 15 tightly arranged therebetween. The valve seat member 14 is formed with a valve opening, and a relatively wide bore, which are axially or vertically aligned with each other and extend through the valve seat member 14. A generally cylindrical protecting bushing 16 is loosely fitted into the bore of the valve seat member 14, and has a plurality of side ports communicating the interior of the valve seat member 14 with the outlet port 12, and a closed bottom end which is brought into engagement with a wall of the casing 1 in order to protect the casing wall from being subjected to the jet flow of the drain fluid and to thus prevent erosion of the casing. The valve seat member 14 carries thereon a generally cylindrical guide member 17 having an inner guide bore axially or vertically aligned with the valve opening in the valve seat member 14, for guiding the vertical displacement of the movable valve member of the temperature-responsive valve, a plurality of side ports formed in the vicinity of the valve opening, and communicating the interior of the guide member 17 with the drain chamber 13, and a flange-like bottom end portion which, in the illustrated embodiment, is integrally spot-welded to the top surface of the valve seat member 14. Alternatively, the valve seat member 14 and the guide member 17 may be formed integrally as a one-piece structure. The valve seat member 14 and the guide member 17 are surrounded by a compression coil spring 18 having its lower end supported by the bottom wall of the drain chamber 13.

The movable valve member of the temperatureresponsive valve comprises a vertically extending valve stem 19 having its lower portion guided by the inner bore of the guide member 17, with its lower end 20 formed as a substantially conical valve element which is engageable with the valve seat, i.e. the peripheral surface of the valve opening in the valve seat member 14. Adjacent to the upper end of the guide member 17, the valve stem 19 is provided with a radially outwardly projecting collar 21 which is applied with an axial force for axially displacing the valve stem 19 upwardly. More particularly, the lower surface of the collar 21 is engageable with the upper surface of the inner peripheral portion of a generally disc-like supporting member 22 with its lower surface supporting the upper end of the compression spring 18 at the outer peripheral portion and engageable with the upper end of the guide member 17 at the inner peripheral portion. Furthermore, a short cylindrical member 23 is secured to the supporting member 22, having a radially outwardly extending flange at the lower end thereof which may be spot-welded to the upper surface of the supporting member 22, and a radially inwardly extending flange at the upper end thereof whose lower surface is engageable with the upper surface of the collar 21. The distance between the upper surface of the supporting member 22 and the lower surface of the upper flange of the cylindrical member 23 is made greater than the thickness of the collar 21 such that the collar 21 is axially or vertically movable with respect to the supporting member 22 and the cylindrical member 23, with a predetermined axial play therebetween. The cylindrical member 23 with its upper and lower flanges may consist of a metal sheet material formed into the desired configuration by press operation.

In accordance with the present invention, the valve stem 19 is used also as the supporting member for a bimetallic column 24 consisting of a plurality of pairs of bimetallic discs which are axially superposed in the manner known per se, and losoely fitted around the valve stem 19. The bimetallic column 24 has its lowermost bimetallic disc supported on the upper flange of the cylindrical member 23. A washer 25 is arranged between two neighbouring pairs of bimetallic discs, to maintain a sufficient effective heating surface area for each bimetallic disc, which would be considerably reduced if the neighbouring pairs of the bimetallic discs were directly superposed with each other. The valve stem 19 may be loosely surrounded by a thin-walled sleeve (not shown) with a length greater than the maximum length of the bimetallic core 24 in its fully expanded state, which may then be fitted with the bimetallic discs forming the column 24 and the washers 25 between the bimetallic discs. As fully described in U.S. Pat. No. 4,320,871, such a sleeve supports the bimetallic discs, effectively preventing side thrusts and friction on the valve stem. The upper end portion of the valve stem 19 is formed with a circumferential groove receiving therein a retainer ring 26 which, together with the collar 21, prevents an unintentional axial withdrawal of the bimetallic column 24 from the stem 19 in the unassembled or disassembled condition of the steam trap. Thus, a sub-assembly is formed by the valve stem 19 with the valve element 20, the disc-like supporting member 22 for the compression spring 18, the cylindrical member 23 secured to the supporting member 22, and the bimetallic column 24.

A substantially cylindrical strainer element 27 with a number of fine openings therethrough may be disposed within the drain chamber 13 to completely surround the bimetallic column 24, which element is retained in position by means of a cover member 28 threadedly connected with the open top end of the casing 10. The cover member 28 has a flange-like upper portion whose lower surface is in tight abutment with the annular top end surface of the casing 10, with a gasket ring 29 disposed therebetween. An adjustable guide member 30 extends vertically through the central portion of the cover member 28, and has a vertical blind bore which is in axial alignment with the inner bore of the guide member 17 and with the valve opening in the valve seat member 14, to axially guide the vertical displacement of the valve stem 19. Thus, the retainer ring 26 carried by the upper end portion of the valve stem 19 is subjected to sliding contact with the bore in the guide member 30, so that the ring 26 consists preferably of a sliding-type seal ring with a low friction coefficient. The guide member 30 has its lower end downwardly projected into the drain chamber 13 so as to engage with the uppermost bimetallic disc of the bimetallic column 24. The guide member 30 is threadedly connectd with the cover member 28, with a gasket ring 31 disposed therebetween, so as to permit an axial positioning of the lower end of the guide member in accordance with the desired temperature based on which the temperature-responsive valve of the bimetal steam trap is to be actuated. To this end, the guide member 30 projects upwardly from the cover member 28, and is formed on its upper end with a tool-engaging portion to be engaged by an appropriate tool, such as a screw driver, when adjusting its axial position. Furthermore, the guide member 30 is maintained in its adjusted position by means of a lock nut 32 threadedly connected with the guide member 30 and urged against the top end surface of the cover member 28. The upper end of the guide member 30 and the lock nut 32 are covered by a cap member 33 threadedly connected with the cover member 28.

Operation of the above-described embodiment is as follows. In the normal operating condition of the bimetal steam trap, the drain chamber 13 is filled with high temperature condensation supplied, e.g., from a high pressure steam system (not shown) which is connected to the inlet port 11 of the casing 10. Thus, the bimetallic column 24 assumes an expanded state as shown in FIG. 1, under the high temperature of the condensation, and presses the compression spring 18 downwardly through the cylindrical member 23 and the disc-like supporting member 22, so that the valve element 20 is maintained in the illustrated closed position in which it is disengaged from the supporting member 22 and urged against the periphery of the valve opening in the valve seat member 14 substantially exclusively with a force which is the product of the pressure of the condensation and the effective cross-sectional area of the valve opening.

As the temperature of the condensation within the drain chamber 13 decreases below the predetermined temperature, and the axial expansion force of the bimetallic column 24 becomes smaller than the axial restoration force of the compressed spring 18, the upper end of the spring 18 begins to move upwardly against the axial thrust or expansion force of the bimetallic column 24. Thus, the disc-like supporting member 22 comes into engagement with the collar 21 to displace the latter axially upwards, accompanying the lifting motion of the valve stem 19 so that the valve element 20 is moved away from the valve seat member 14, i.e. from the illustrated closed position to its open position. By this, it becomes possible to discharge the condensation with a temperature below the predetermined level, through the side ports of the cylindrical guide member 17, the valve opening in the valve seat member 14, and the side ports of the protection bushing 16, and from the outlet port 12.

After the low temperature condensation is discharged from the bimetal steam trap in the manner mentioned above, the drain chamber is supplied with a fresh high temperature condensation, and thus the bimetallic column 24 is heated again and subjected to thermal expansion, generating an axial thrust which overcomes the upwardly directed force of the compression spring 18. Consequently, the bimetallic column 24 begins to compress the spring 18 through the cylindrical member 23 mounted on the supporting member 22, so that the supporting member 22 is disengaged from the collar 21 of the valve stem 19, permitting the downward displacement of the valve stem 19 and hence, a self-aligned movement of the valve element 20 into its closed position.

It will be appreciated that the above-described operation of the temperature-responsive valve is automatically carried out in accordance with whether or not the temperature of condensation is below the predetermined level which can be adjusted by the axial positioning of the guide member 30 as its lower end determines the thermal expansion stroke of the bimetallic column 24. Since, according to the present invention, the valve stem 19 is used to support the bimetallic column 24 as well, and is properly guided by the upper and lower guide members 17 and 30, the valve element 20 can be displaced between the closed and open positions without an axial misalignment. Moreover, as previously mentioned, the steam trap according to the present invention makes use of a sub-assembly formed by the valve stem 19 with the valve element 20, the disc-like supporting member 22 for the compression spring 18, the cylindrical member 23 mounted on the supporting member 22, and the bimetallic column 24. Thus, the number of components to be assembled during the final production step is minimized with the result that the production and maintenance of the steam trap can be carried out easily and economically, while improving the operation reliability of the temperature-responsive valve.

Depending upon the nature of the steam system with which the bimetal steam trap of the present invention is to be associated, on rare occasions, condensation including very fine substances, such as scales and the like, may be supplied to the steam trap. These substances, when not eliminated by the strainer element 27, tend to accumulate onto the peripheral surface of the valve opening and to thus prevent a complete closure of the temperature-responsive valve. This results in the leakage of condensation from the steam trap, and hence in the continued supply into the steam trap of high temperature condensation by which the temperature within the drain chamber 13 increases beyond the normal working temperature of the steam trap, so that the bimetallic column tends to expand excessively. When such an additional expansion is of the magnitude that cannot be absorbed by the gap between the lower surface of the upper flange of the cylindrical member 23 and the upper surface of the collar 21, the bimetallic column 24 may be subjected to permanent deformation. Such a problem is also the case where, after a rapid discharge of low temperature condensation, the steam trap is supplied with high temperature condensation in short a time and the bimetallic column is subjected to thermal impulse. Accordingly, in order to avoid the permanent deformation of the bimetallic column, as shown in FIG. 2, a dish-like resilient member 23' may be fixedly or detachably secured to the supporting member 22, instead of the cylindrical member 23 in the previous embodiment. The resilient member 23' has a stiffness greater than that of the compression spring 18, and is provided with an inner peripheral portion whose lower surface is engageable with the upper surface of the collar 21 secured to the valve stem 19. With such an arrangement, any excessive axial thrust of the bimetallic column 24 can be effectively absorbed by the resilient deformation of the resilient member 23', so that the bimetallic column is positively protected from permanent deformation.

While the present invention has been explained with reference to certain preferred embodiments, the present invention is not limited thereto, and various modifications and variations may be made without departing from the scope of the present invention.

What is claimed is:

1. A bimetal steam trap comprising: a casing with inlet and outlet ports and defining therein a chamber which is in communication with the inlet port; a valve seat member secured to one wall of the chamber and formed wth a valve opening which is adapted to bring the chamber into communication with the outlet port and which is surrounded by a valve seat surface; a vertically displaceable elongate valve member having one end formed as a valve element which is engageable with the valve seat surface; means for supporting and guiding the vertical displacement means for supporting and guiding the vertical displacement of the valve member in alignment with said valve opening, including a first guide member secured to the valve seat member, and a second guide member secured to the wall of the chamber opposing to said one wall; axial force transmitting means mounted on the valve member so as to be axially movable together with the valve member with a predetermined amount of axial play therebetween, resilient means having one end supported by said one wall of the chamber, and the other end in engagement with one side of said axial force transmitting means so as to axially urge the valve member in a direction in which said valve element is moved away from said valve seat surface; and a bimetallic column including a plurality of pairs of bimetallic discs which are superposed with each other and loosely supported by and around said valve member, said bimetallic column having one end in engagement with that end portion of the second guide member which opposes to the first guide member, with the other end of the bimetallic column being in engagement with the other side of said axial force transmitting means such that when the bimetallic column is heated by high temperature condensation supplied to the chamber from the inlet port, the bimetallic column generates an axial thermal expansion thrust which is applied to said axial force transmitting means and overcomes the resilient force of said resilient means, thereby permitting the valve member to axially displace in a direction in which said valve element is released from said axial thermal expansion thrust of the bimetallic column and said resilient force of the resilient means, and is urged against said valve seat surface under the pressure of the condensation within the chamber.

2. The bimetal steam trap as claimed in claim 1, wherein said valve member is provided with a radially outwardly extending collar, said axial force transmitting means including a disc-like member with a first peripheral portion in engagement with said the other end of said resilient means, and a second peripheral portion engageable with one side of said collar, said disc-like member being further provided with a third peripheral portion which is spaced axially from said second peripheral portion and is engageable with the other side of said collar.

3. The bimetal steam trap as claimed in claim 2, wherein said axial force transmitting means includes an axially extending cylindrical member with one end mounted on said disc-like member, the other end of said cylindrical member having a radially inwardly projecting flange, said third peripheral portion being formed by said flange.

4. The bimetal steam trap as claimed in claim 2, wherein said axial force transmitting means includes a dish-like member with an outer periphery mounted on said disc-like member, and an inner periphery forming said third peripheral portion.

5. The bimetal steam trap as claimed in claim 4, wherein said dish-like member consists of a resilient member with the stiffness greater than the stiffness of said resilient means.

6. The bimetal steam trap as claimed in claim 2, wherein said disc-like member is integrally provided with said third peripheral portion.

7. The bimetal steam trap as claimed in claim 2, wherein said disc-like member is detachably provided with said third peripheral portion.

8. The bimetal steam trap as claimed in claim 1, wherein said valve member, said bimetallic column and said axial force transmitting means form a sub-assembly.

* * * * *